(12) United States Patent
Foust et al.

(10) Patent No.: US 8,739,819 B2
(45) Date of Patent: Jun. 3, 2014

(54) FLUID REGULATOR HAVING PRESSURE REGISTRATION FLOW MODIFIER

(75) Inventors: Gregory L. Foust, Plano, TX (US); Jared B. Chizek, McKinney, TX (US); Mark A. Michnevitz, McKinney, TX (US); Tung K. Nguyen, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 322 days.

(21) Appl. No.: 13/006,275

(22) Filed: Jan. 13, 2011

(65) Prior Publication Data

US 2011/0174381 A1    Jul. 21, 2011

Related U.S. Application Data

(60) Provisional application No. 61/295,972, filed on Jan. 18, 2010.

(51) Int. Cl.
*F16K 17/34* (2006.01)
*G05D 16/06* (2006.01)

(52) U.S. Cl.
CPC .................................. *G05D 16/0683* (2013.01)
USPC .......... 137/484.8; 137/499; 137/500; 138/46; 251/118

(58) Field of Classification Search
CPC .. F16L 55/027; G05D 7/012; G05D 16/0683; G05D 16/0675; G05D 16/0663; G05D 16/0613; G05D 7/0173; G05D 7/0106
USPC ........... 137/488–505.47; 251/118; 138/45, 46
See application file for complete search history.

(56) References Cited

U.S. PATENT DOCUMENTS

| | | | | | |
|---|---|---|---|---|---|
| 847,944 | A | * | 3/1907 | Hubner et al. | 137/484.8 |
| 1,895,047 | A | * | 1/1933 | Neumann | 137/484.8 |
| 1,918,602 | A | * | 7/1933 | Joyce | 137/484.4 |
| 2,094,707 | A | * | 10/1937 | Jones | 251/212 |
| 2,619,983 | A | * | 12/1952 | Roberts | 137/484.8 |

(Continued)

FOREIGN PATENT DOCUMENTS

| | | |
|---|---|---|
| GB | 367284 A | 2/1932 |
| GB | 2060140 A | 4/1981 |
| GB | 2300733 A | 11/1996 |

OTHER PUBLICATIONS

International Preliminary Report on Patentability for PCT/US2011/021162, mailed Aug. 2, 2012.

(Continued)

*Primary Examiner* — Craig Schneider
*Assistant Examiner* — Jessica Cahill
(74) *Attorney, Agent, or Firm* — Marshall Gerstein & Borun LLP (57) ABSTRACT

A fluid regulating device includes a valve body having an inlet, an outlet, a valve port, and a control element shiftable within the valve body. A control assembly includes an actuator coupled to the control element and includes a diaphragm disposed adjacent a diaphragm chamber. A sense tube has a first end, a second end, and an intermediate portion, the first end positioned to communicate with the diaphragm chamber, the second end disposed adjacent the outlet, and the intermediate portion disposed adjacent an intermediate portion of the outlet. The sense tube includes a shoulder and a flared portion, with the flared portion disposed adjacent the second end.

27 Claims, 5 Drawing Sheets

(56) References Cited

U.S. PATENT DOCUMENTS

| | | | |
|---|---|---|---|
| 2,690,758 A * | 10/1954 | Lee | 137/460 |
| 2,698,026 A * | 12/1954 | Roberts et al. | 137/458 |
| 3,086,548 A * | 4/1963 | Galiger et al. | 137/484.8 |
| 3,722,536 A * | 3/1973 | Hill et al. | 137/505.46 |
| 4,069,839 A * | 1/1978 | Hughes | 137/505.46 |
| 7,192,665 B2 * | 3/2007 | Nakajima et al. | 429/444 |
| 2008/0257418 A1 | 10/2008 | Kranz et al. | |
| 2009/0260697 A1 | 10/2009 | Mevius et al. | |
| 2009/0261281 A1 | 10/2009 | Mevius et al. | |

OTHER PUBLICATIONS

International Search Report for PCT/US2011/021162, dated Aug. 8, 2011.

Written Opinion for PCT/US2011/021162, dated Aug. 8, 2011.

* cited by examiner

FLUID REGULATOR HAVING PRESSURE REGISTRATION FLOW MODIFIER

FIELD OF THE INVENTION

The present invention relates generally to regulators such as fluid or gas regulators and, more specifically, to a regulator having a pressure registration flow modifier.

BACKGROUND

Regulators are commonly employed in fluid or gas distribution systems to control the pressure in the system downstream of the regulator. As is known, the pressure at which a typical gas distribution system supplies gas may vary according to the demands placed on the system, the climate, the source of the supply, and/or other factors. However, most end-user facilities equipped with, for example, gas appliances such as furnaces, ovens, etc., require the gas to be delivered in accordance with predetermined pressure parameters. Therefore, such distribution systems use gas regulators to ensure that the delivered gas meets the requirements of the end-user facilities.

Conventional gas regulators generally include a closed-loop control actuator or control assembly for sensing and controlling the pressure of the delivered gas. Many regulators use a pneumatic control assembly having a diaphragm and a sense tube or pitot tube that extends into the outlet side of the regulator. The tube senses, for example, the pressure or other parameters in the downstream or outlet end of the regulator, and communicates that sensed parameter to the control assembly. Based on the sensed parameter, the control assembly makes any needed adjustments to the position of a control element, which then keeps the sensed parameter at a desired value or within an acceptable range.

Figure 1:
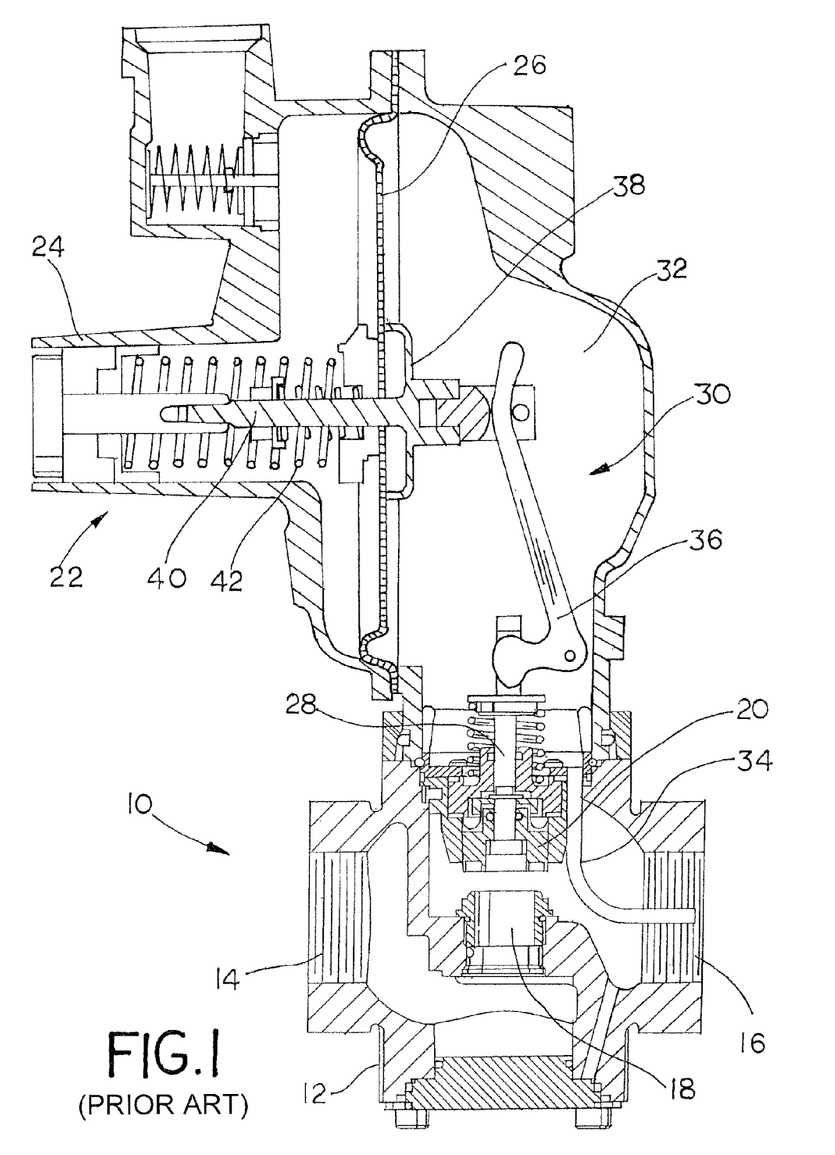
FIG. 1 is a cross-sectional view of a conventional fluid regulating device having a sense tube extending between a diaphragm chamber of a control assembly and an outlet of the device.

FIG. 1 depicts an example of a conventional regulator device 10. The regulator device 10 includes a valve body 12 having an inlet 14, an outlet 16, and a valve port 18. A control element 20 is shiftably disposed within the valve body 12, such that the control element 20 can be displaced relative to the valve port 18 in order to control the flow of a fluid between the inlet and the outlet. The regulator device 10 includes a control assembly 22 including a valve actuator 24. The control assembly 22 includes a diaphragm 26, and the control assembly 22 is connected to a valve stem 28 via a suitable linkage assembly 30. The valve stem 28 is connected to the control element 20, such that movement of the valve actuator 24 moves the control element 20 relative to the valve port 18. The control assembly 22 includes a diaphragm chamber 32, which is in flow communication with the outlet 16 via a sense tube 34.

The inlet 14 of the regulator device 10 receives gas from a gas distribution system, for example, and the outlet 16 delivers gas to an end-user facility such as a factory, a restaurant, an apartment building, etc. having one or more appliances. The control assembly 22 and the actuator 24 control the position of the control element 20, and consequently gas flowing through the regulator device 10 flows into the inlet 14, through the valve port 18, and out the outlet 16 to the end-user facility, with the position of the control element 20 thus controlling the flow of gas through the device.

The linkage assembly 30 includes a control arm 36, which in turn is connected to the valve stem 28. The control assembly 22, using the valve actuator 24, regulates the outlet pressure of the regulator device 10 based on the outlet pressure sensed in the outlet 16. Specifically, the control assembly 22 includes a diaphragm support plate 38 coupled to a piston 40, which together move the position of the diaphragm 26, the control arm 36, the valve stem 28, and ultimately the control element 20. The sense tube 34 senses the pressure in the outlet 16. If the sensed pressure is too low, the pressure in the diaphragm chamber 32 drops accordingly by virtue of the flow communication provided by the sense tube 34. Consequently, because the desired control pressure is applied to the piston side of the actuator 24, the pressure differential will cause the diaphragm 26 to move (to the right when viewing FIG. 1), which in turn moves the control element upward when viewing FIG. 1. This opens the valve port more, thus increasing the pressure in the outlet 16. On the other hand, if the sensed pressure is too high, the pressure in the diaphragm chamber is greater than the desired control pressure, and the pressure differential against the diaphragm causes the diaphragm to move to the left when viewing FIG. 1, thus moving the control element closer to the valve seat, which decreases the flow through the valve port. The control assembly 22 further includes a control spring 42 in engagement with a top-side of the control assembly 22 to offset the outlet pressure sensed by the diaphragm 26. Accordingly, the desired outlet pressure, which may also be referred to as the control pressure, is set by the selection of the control spring 42.

Multiple body sizes may be offered for fluid regulator platforms. When the size of the outlet of a regulator device changes, there is a resulting change in how the flow path recovers once gas/fluid has exited the regulator body. Because the outlet of the valve body is where the outlet pressure is sensed, in order to control the regulator it is desirable that the pressure zone remains the same for all body sizes. In real world applications however, it is unreasonable to expect the pressure zone to be stationary in the pipe as the flow path changes. This sensed pressure fluctuation creates areas of increased boost and droop, which may limit overall capacity.

There also exist certain flow conditions caused by the geometry of the flow path that cause the sensed outlet pressure of the regulator to abruptly boost or droop. These pressure spikes may cause the outlet pressure to exceed the required accuracy class. This boost or droop out of the specified accuracy class in turn forces the regulator to be rated at a much lower capacity than if the sensed pressure were to stay constant.

SUMMARY

In accordance with an aspect of the invention, a fluid regulating device includes a valve body having an inlet, an outlet, a valve port, and a control element shiftably disposed within the valve body, with the control element adapted to be displaced relative to the valve port to control the flow of a fluid between the inlet and the outlet. A control assembly comprises a valve actuator and is operatively coupled to the control element, with the control assembly including a diaphragm disposed adjacent a diaphragm chamber. A sense tube includes a first end, a second end, and an intermediate portion, the first end positioned to provide flow communication with the diaphragm chamber of the control assembly, the second end disposed adjacent a distal portion of the outlet and the intermediate portion disposed adjacent an intermediate portion of the outlet. A shoulder is carried by the intermediate portion of the sense tube, and a flared portion is carried by the sense tube adjacent the second end.

In further accordance with one or more preferred forms, the sense tube may include a bend, and the shoulder may be disposed in a downstream direction from the bend. The shoulder may comprise a cylinder extending along the sense tube and may have an external diameter greater than an external diameter of the sense tube. The cylinder may include a downstream end, and the flared portion may be spaced away from the downstream end of the cylinder.

The outlet end of the valve body may include an outlet face, and the outlet of the sense tube may be positioned past the outlet face in a downstream direction. The sense tube may include a length adjuster, and the sense tube may have a first portion extending from the first end through a bend, and a second portion carrying the shoulder and the flared portion, with the second portion removably attached to the first portion. The portions or sections may be joined by a pin in slot connection, or by a threaded connection. The flared portion may adjustable and may include a flexible section, the flexible section arranged to shift between a first flared position in which the flexible section is oriented at a first angle relative to an axis of the outlet, and a second flared position in which the flexible section is oriented at a second angle relative to the axis of the outlet, the second angle greater than the first angle.

In accordance with another aspect of the invention, a fluid regulating device includes a valve body having an inlet, an outlet, and a valve port, the valve body defining a flow path extending from adjacent the inlet, through the valve port, and exiting through the outlet along an outlet axis. A control element is shiftably disposed within the valve body, the control element displaceable relative to the valve port to control the flow of a fluid between the inlet and the outlet. A control assembly comprises a valve actuator, the control assembly operatively coupled to the control element, the control assembly including a diaphragm disposed adjacent a diaphragm chamber. A sense tube having a first end, a second end, and an intermediate portion is provided, the first end positioned to provide flow communication with the diaphragm chamber of the control assembly, the second end disposed adjacent a distal portion of the outlet and the intermediate portion disposed adjacent an intermediate portion of the outlet. A flow interrupter is disposed in the flow path adjacent the intermediate portion of the sense tube, and a flared portion is disposed in the flow path adjacent the second end and downstream of the flow interrupter.

In accordance with yet another aspect, a method of sensing output pressure in a fluid regulating device, and/or a method of modifying an existing fluid regulating device, may comprise the steps of providing a valve body having an inlet, an outlet, and a valve port, the valve body defining a flow path extending from adjacent the inlet, through the valve port, and exiting through the outlet along an outlet axis, providing a control element shiftably disposed within the valve body, the control element displaceable relative to the valve port to control the flow of a fluid between the inlet and the outlet, and providing a control assembly comprising a valve actuator, with the control assembly operatively coupled to the control element, and with the control assembly including a diaphragm disposed adjacent a diaphragm chamber. A sense tube is provided and includes a first end, a second end, and an intermediate portion, and the sense tube is positioned with the first end in flow communication with the diaphragm chamber of the control assembly, and with the second end positioned adjacent a distal portion of the outlet of the valve body. A flow interrupter is positioned along the flow path adjacent an intermediate portion of the sense tube, and a flared portion is provided on the sense tube and positioned adjacent the second end of the sense tube and downstream of the flow interrupter.

DETAILED DESCRIPTION OF THE PREFERRED EMBODIMENTS

Figure 2:
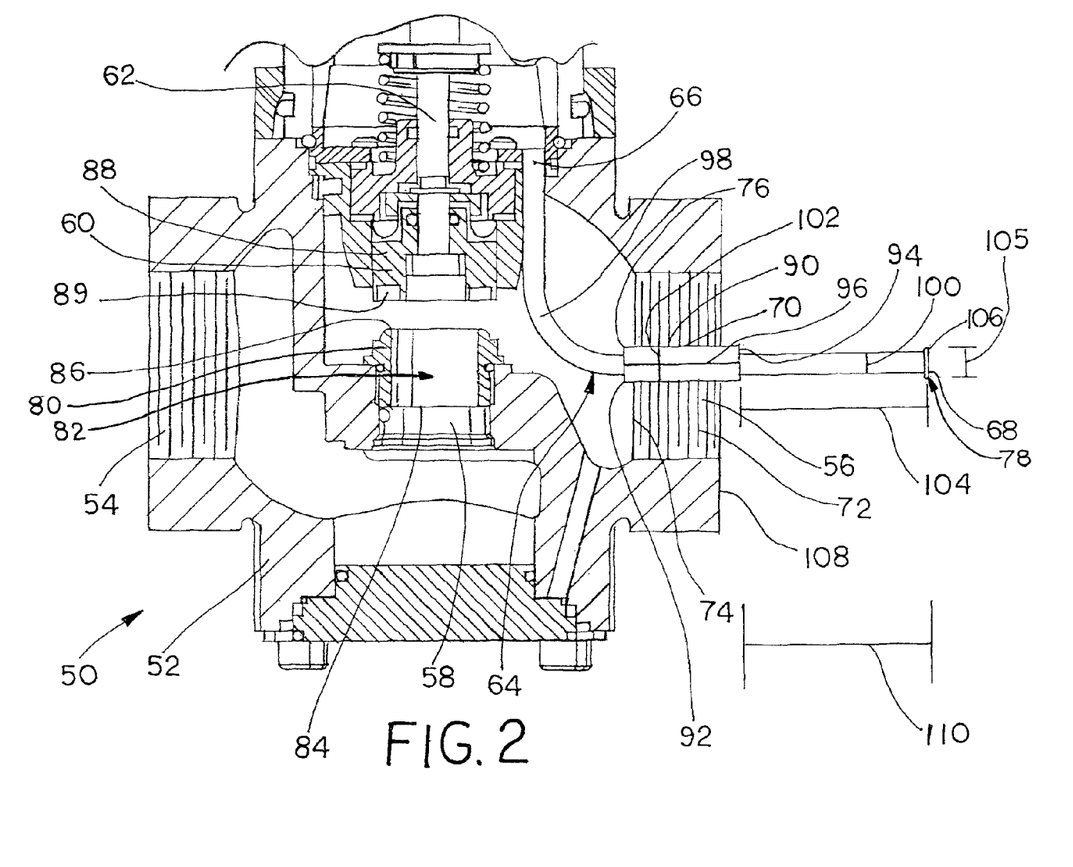
FIG. 2 is an enlarged fragmentary cross-sectional view of valve body of a fluid regulating device having a sense tube assembled in accordance with the teachings of a first disclosed example of the present invention.

Referring now to the drawings, FIG. 2 illustrates a fluid regulating device assembled in accordance with the teachings of a first disclosed example of the present invention and referred to by the reference numeral 50. The fluid regulating device 50 includes a valve body 52 including a valve inlet 54, a valve outlet 56, and a valve port 58. A control element 60 is shiftably disposed within the valve body 52, such that the control element 60 can be displaced relative to the valve port 58 in order to control the flow of the fluid between the inlet 54 and the outlet 56. The fluid regulating device 50 includes a valve stem 62 which is connected to the control element 60 and to a suitable control assembly in order to control the position of the control element 60. The control assembly may be the control assembly 22 described above with respect to FIG. 1. Consequently, the control assembly 22 will include the same or similar components described above with respect to FIG. 1, such as the valve actuator 24, the diaphragm 26, the linkage assembly 30, the diaphragm chamber 32, the control arm 36, the diaphragm support plate 38, and the piston 40.

The fluid regulating device 50 also includes a sense tube 64 having a first end 66, a second end 68, and an intermediate portion 70. The first end 66 is positioned to provide flow communication with the diaphragm chamber 32 of the control assembly 22, and the second end 68 is disposed adjacent the outlet 56, preferably generally adjacent a distal portion 72 of the outlet 56. The intermediate portion 70 is preferably disposed generally adjacent an intermediate portion 74 of the outlet 56. The sense tube 64 includes a shoulder 76 which, in the disclosed example, is disposed generally adjacent to the intermediate portion 70 of the sense tube 64. A flared portion 78 is formed on or otherwise carried by the sense tube 64. In the example shown, the flared portion 78 is disposed adjacent the second end 68. In accordance with the disclosed example, the shoulder 70 acts as a flow interrupter. Although certain exemplary forms for the shoulder/flow interrupter are discussed herein, other forms may prove suitable.

In the example shown, the valve body 52 includes an insert or valve seat 80 that includes a central bore 82 that generally defines the valve port 58. The valve seat 80 may be threaded into the valve body 52, or alternatively the valve seat 80 may be secured to the valve body 52 using any other suitable mechanism. Preferably, suitable seals are provided. The valve seat 80 includes a first end 84 and a second end 86. The control element 60, which may be a valve disc 88 or any other a suitable control element, may include a seal 89 which seats against the second end 86 of the valve seat 80. Those of skill in the art will realize that when the control element 60 is seated against the valve seat 80, the fluid regulating device 50 would effectively be closed with no flow through the valve body 52.

In the example of FIG. 2, the shoulder 76 is formed by a cylinder 90 which surrounds an external surface of the sense tube 64. The cylinder 90 may be a separate hollow cylinder sized to slide over the sense tube 64, or the cylinder 90 may be integrally or unitarily formed with all or with a portion of the sense tube 64. The cylinder 90 includes an upstream or first end 92 and a downstream or second end 94 which, in the disclosed example, are separated by a distance 96. The sense tube 64 includes a bend 98, and in the example shown the cylinder 90 and hence the shoulder 76 are carried on the sense tube 64 downstream of the bend 98 (i.e., in a direction extending away from the outlet 56 of the valve body 52, and toward the end user facility).

As can be seen from FIG. 2, the sense tube 64 includes a diameter 100, while the cylinder 90 includes a diameter 102. In the example shown, the diameter 102 is greater than the diameter 100. Consequently, the shoulder 76 has a diameter greater than the diameter 100 of the sense tube. The flared portion 78 is spaced away from the second and 94 of the cylinder 90 by a distance 104. In the example shown, the flared portion 78 has a diameter 105 which is greater than the diameter 100 of the sense tube 64. The flared portion 78 may be, for example, an outwardly extending ring 106, or alternatively may be formed by other suitable shapes. For example, the flared portion 78 may be formed by flaring the end of the tube outwardly using known techniques, or an outer ring could be attached to the end of the tube. The flare also could be machined from a solid piece of bar stock, or a machined flare could be attached to the end of the tube. Still other techniques may prove suitable, and one or more of the foregoing techniques, or still other techniques, may be combined.

Referring still to FIG. 2, the valve body 52 includes an outlet face 108 which generally defines the downstream end of the outlet 56 of the valve body 52. In the example shown, the second end 68 of the sense tube 64, and hence the flared portion 78 of the sense tube 64, both extend past the outlet face 108 valve body 52 a distance 110, measured in the downstream direction. In practice, the distance 110 is preferably chosen to fall with a range of values, and specifically the distance 110 is preferably about 40 mm, and still more preferably 40 mm. Other dimensions may prove suitable, based on a number of considerations.

Figure 3:
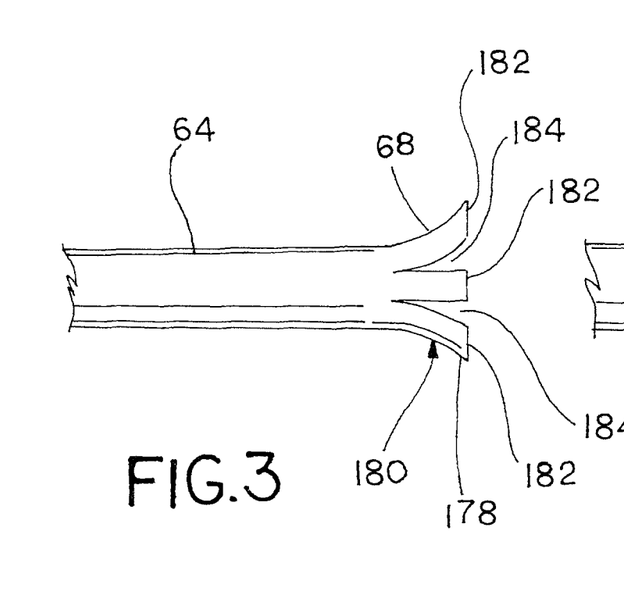
FIG. 3 is an enlarged fragmentary elevational view of a downstream end of a sense tube assembled in accordance with the teachings of another disclosed example of the present invention and having an adjustable flared portion, with the adjustable flared portion shown in an expanded position.
Figure 4:
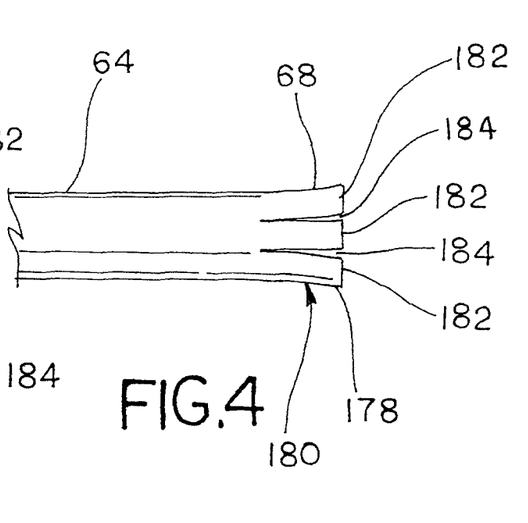
FIG. 4 is an enlarged fragmentary elevational view similar to FIG. 3 but illustrating the adjustable flared portion in a contracted position.

Referring now to FIGS. 3 and 4, an alternative embodiment for the flared portion is shown and is referred to by the reference numeral 178. The flared portion 178 includes a flexible section 180 disposed at the second end 68 of the sense tube 64. The flexible section 180 is shiftable from a first or expanded position as shown in FIG. 3, and a second or contracted positioned as shown in FIG. 4. In accordance with the example of FIGS. 3 and 4, the flexible section 180 is arranged to be disposed in the first or expanded positioned in relatively low flow situations, and is further arranged to be disposed in the second or contracted positioned in relatively high flow situations. Based on the present exemplary disclosure, one of skill in the art will understand that different parameters will have an effect on whether the flare should be open or closed. Boost and droop characteristics are affected by the size of the body, the outlet pressure set point, the P1/P2 pressure drop, and the spring range. Therefore, although "high flow" and "low flow" as used above are relative terms, one of skill in the art, upon reading the foregoing, can determine under what conditions he/she may wish the flexible section to shift between different positions. In the example shown, the flexible section 180 is formed by a plurality of flexible strips 182 separated by cuts 184 formed in the second end 68 of the sense tube 64. The flexible section may be formed a number of ways. For example, the flare could be formed using a tube of plastic or metal that is slit in a number of places around the diameter of the exit end of the tube, and the pieces between the slits can be flared back to a desired radius, curvature, or angle. The tube may have a relatively thin thickness to facilitate cutting the slits. Another option may be to attach multiple strips of a wire, such as a relatively thin gauge of wire, around the outside diameter of the tube, and flare the wires back to a desired radius, curvature, or angle. Then a flexible sheet or panel, or sections of sheets or panels, may be draped or otherwise suitably attached over the wires at or adjacent the end of the tube to create an expanded or expandable area, similar to an umbrella. Other techniques may prove suitable.

When assembled in accordance with the teachings of the example shown in FIGS. 3 and 4, the flexible section 180 allows the flared portion 178 to be self-adjusting based on the flow characteristics of the gas or fluid flowing through the outlet 56 of the valve body 52. When assembled as disclosed, the flared portion 178 creates a boosting effect for the outlet pressure during low flow/low pressure conditions. This boosting effect allows for the capacity to increase without drooping out of the rated accuracy class for the fluid regulating device. However, while it may be desirable to allow boost at low pressure differentials (low flow situations), the boosting provided by a flared portion may limit the capacity of the fluid regulating device at a high pressure drops (hi flow situations). At higher inlet pressures, the pressure differential is increased and therefore there is a resulting increase in flow. This increase in flow consequently increases the low pressure zone at the end of the sense tube 64, which can cause a regulator to boost out of its accuracy class. By providing a self-adjusting flared portion 178 as shown, the flared portion 178 collapses down when the flow increases, thereby preventing the device from boosting out of range.

Figure 5:
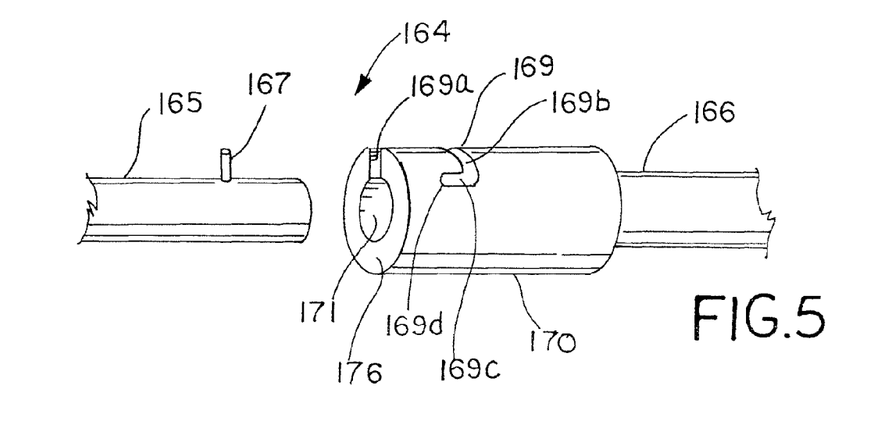
FIG. 5 is an enlarged fragmentary elevational view illustrating an exemplary removable coupling for joining a first portion of sense tube to a second portion of the sense tube.

Referring now to FIG. 5, an alternative embodiment for the sense tube is shown and is referred to by the reference numeral 164. In the example of FIG. 5, the sense tube 164 is divided into a first section 165 and a second section 166. As shown in FIG. 5, the first section 165 and the second section 166 are separable from one another and may be movably attached to one another. Specifically, the second section 166 is provided with a cylinder 170 (which may be substantially similar to the cylinder 90 described above with respect to the first disclosed example). As with the cylinder 90 described above, the cylinder 170 includes a shoulder 176, and preferably includes the same or similar limitations regarding the first end 92, the second end 94, and the distance between the end 94 and the flared portion (not shown in FIG. 5). The first section 165 includes a pin 167, while the second section 166 includes a slot 169 formed in the cylinder 170. The slot 169 has a first portion 169a extending lengthwise along the cylinder 170 in a direction generally corresponding to the downstream direction. The slot 169 also includes a second section 169b that extends generally transverse relative to the first section 169a, and also includes a third section 169c that extends generally parallel to the first section 169a. A central bore 171 in the cylinder 170 is sized to extend over the first section 165. In order to attach the second section 166 to the first section 165, the cylinder 170 is positioned so that the pin 167 slides into the first section 169a of the slot 169 until the pin 167 reaches the second section 169b. At that point, the cylinder 170 is rotated until the pin 167 reaches the third section 169c of the slot 169. At that point, the second section 166 is retracted slightly (moved to the right when viewing FIG. 5) until the pin reaches an end 169d of the slot 169.

When assembled in accordance with the teachings of FIG. 5, the second section 166 of the sense tube 164 may be constructed in any desired length. In accordance with the example shown, the position of the flared portion (not shown in FIG. 5, but which may be the same or similar to any of the other flared portions shown or described herein) may be positioned at any desired downstream location. Similarly, the size of the shoulder 176, along with the length of the cylinder 170 may be chosen as desired.

By adjusting the length of the sense tube, the second end 68 of the sense tube may be placed in a more fully developed pressure region of the outlet pipe in order to reduce any fluctuations in pressure that may affect how the regulator device performs. Due to the varying flow geometry caused by the flow path in multiple body sizes, it may be desirable to have multiple possible extension links that can be used on each selected body size and for each selected or desired pressure set point. When assembled in accordance with the teachings herein, an adjustable, removable extension for the sense tube can be easily removed and reattached while still remaining secured to the rest of the device when installed.

Figure 6:
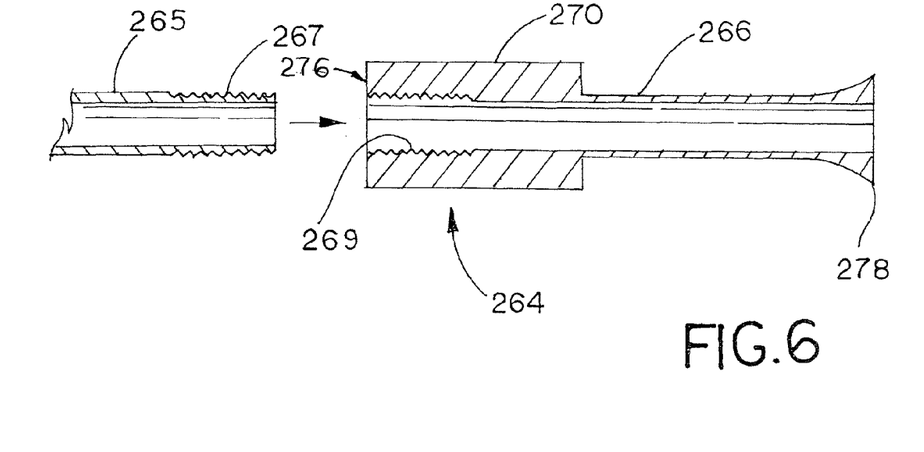
FIG. 6 is an enlarged fragmentary cross-sectional view illustrating another exemplary removable coupling for joining the first portion of the sense tube to the second portion of the sense tube.

Referring now to FIG. 6, another alternative embodiment for the sense tube is shown and is referred to by the reference numeral 264. The sense tube 264 includes a first section 265 in a second section 266. The first section 265 and the second section 266 are separable from one another and may be removably attached to one another. Specifically, the second section 266 is provided with a cylinder 270 (which may be substantially similar to the cylinder 90 described above with respect to the first disclosed example). As with the cylinder 90 described above, the cylinder 270 includes a shoulder 276, and preferably includes the same or similar limitations regarding the first end 92, the second end 94, and the distance between the end 94 and the flared portion (not shown in FIG. 5). The first section 265 includes external threads 267, while the second section 266 includes internal threads 269 formed in the cylinder 270. The internal threads 269 are sized to threadingly engage the external threads 267 on the first section 265 in order to attach the second section 266 to the first section 265. As with the embodiment described above with respect to FIG. 5, the length of the second section 266 may be selected as desired to place a flared portion 278 at a desired location.

Figures 7, 8:
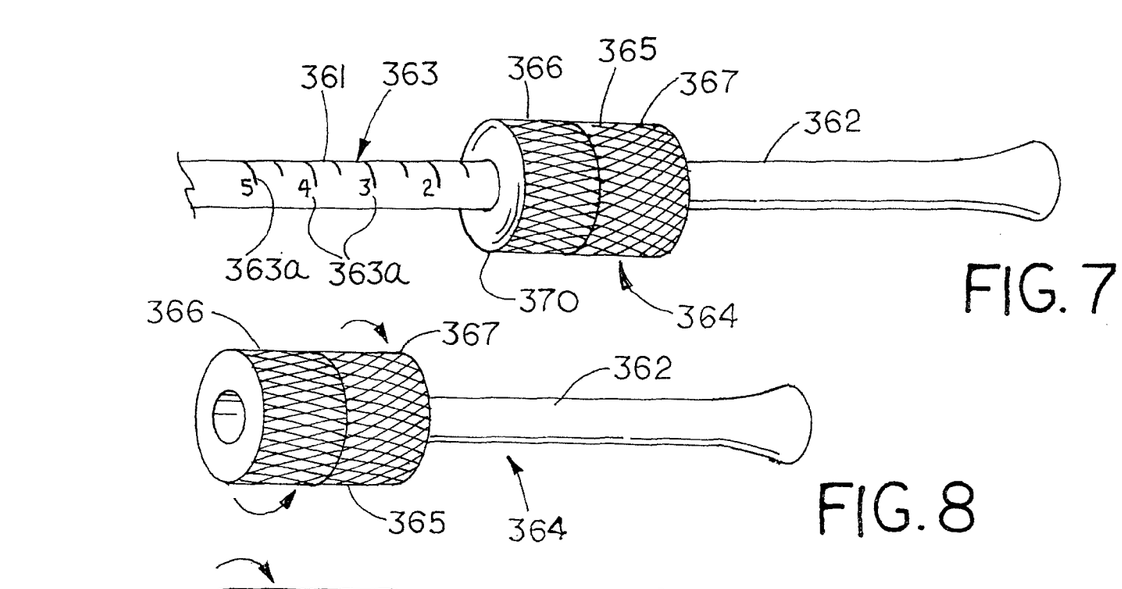
FIG. 7 is an enlarged fragmentary view and perspective of a downstream portion of the sense tube having a length adjuster and a graduated scale.
FIG. 8 and FIG. 9 are fragmentary views in perspective, similar to FIG. 7, and illustrating the counter-rotating nature of the length adjuster assembly.
Figure 9:
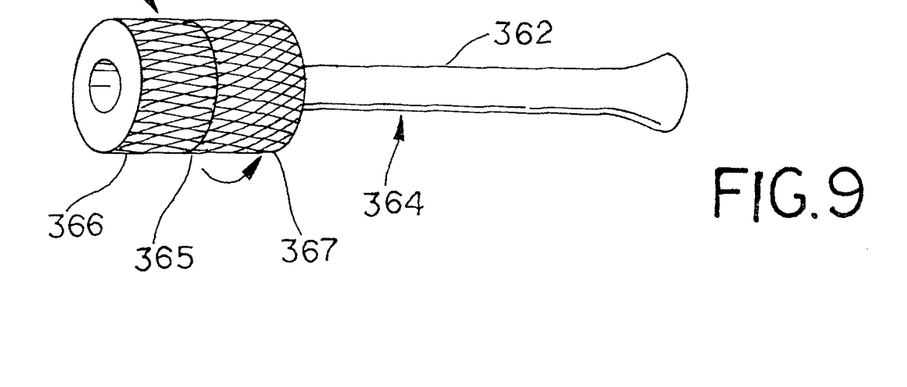

Referring now to FIGS. 7-9, another adjustable sense tube is shown and is referred to by the reference numeral 364. In the example shown, the sense tube 364 includes a length adjuster 365 having a first part 366 and a second part 367. Preferably, the first and second parts 366 and 367 are threaded, such that the length adjuster 365 may be loosened by counter rotating the first and second parts 366 and 367 as shown in FIG. 8. The length adjuster 365 may be tightened by counter rotating the first and second parts 366 and 367 as shown in FIG. 9. By loosening the length adjuster 365, the overall length of the sense tube 364 may be adjusted. Further, the length adjuster 365 is generally cylindrical, and therefore defines a shoulder 370, which may function in the same or similar manner to the shoulder 76 described above with respect to the first disclosed example. Still further, the cylindrical length adjuster 365 preferably includes the same or similar limitations regarding the first end 92, the second end 94, and the distance between the second end 94 and the flared portion 78. As with the embodiments described in FIG. 5 in 6, the length adjuster 365 allows for placement of the shoulder 370 at a desired location along a flow path extending through the outlet of the valve body 52, allows for placement of the flared portion 78 at a desired location along the flow path, and allows for adjustment between the flared portion 78 and the shoulder 370. As shown in FIG. 7, a first part 361 of the sense tube 364 preferably includes a graduated scale 363 having length indicia 363a. Consequently, using the scale 363 and or the indicia 363a, a user can determine the combined effective length of the first part 361 and the second part 362 of the sense tube 364. As alluded to above, in accordance with the disclosed example or examples it may be useful to adjust the length of the sense tube in order to communicate a more uniform pressure to the actuator assembly. Using the embodiment of any one of FIGS. 5-9, a sense tube and/or a removable/interchangeable sense tube extension that may be available in, or be adjusted to, many different lengths may allow for ready adjustment of the length of the extension, may allow for ready placement of the flared portion and/or the flow interrupter at a desired location, and may also save manufacturing and/or assembly costs. Further, because one or more of the exemplary sense tubes shown and described herein may position the second end of the sense tube beyond the valve body 52, providing for an adjustable and/or removable sense tube extension may reduce or eliminate the cost of specialized shipping requirements.

In accordance with one or more aspects of the present invention, the flared portion placed adjacent the end of the sense tube may limit the effect that body size has on flow geometry, and in turn may limit the effect that body size has on the pressure zone. The flared portion creates an artificial low-pressure zone. This low-pressure zone helps at both low pressure and at high pressure setpoints. At low pressure setpoints where the flare has little effect, there is already a natural boosting on the outlet pressure as flow increases, which helps to increase the capacity of the fluid regulator device. On high pressure setpoints the opposite effect happens. As the flow rate increases, the outlet pressure begins to droop out due to the restriction caused by the valve orifice adjacent the control element. With the flare at the end of the sense tube, as the flow increases the size of the low pressure zone created at the end of the sense tube grows. The low sense pressure allows the regulator to operate as if there was not enough downstream pressure, causing it to stay wide open and allow the gas to flow without restriction. This increases the capacity of the fluid regulator within each accuracy class.

Along with the addition of the flare at the end of the sense tube, the shoulder or flow interrupter may be placed immediately after the bend. This shoulder or interrupter creates a small amount of disruption in the flow path as the flow exits the orifice adjacent the control element. By disrupting the flow path the pressure profile within the pipe is made more homogenous when it is sensed by the sense tube. When producing this homogenous pressure profile the effects of a concentrated high/low pressure zone are reduced. This prevents the outlet pressure from boosting or drooping out of the specified accuracy class prematurely.

Preferably, the sense tube extends into the downstream pipe. In accordance with the disclosed example, this arrangement also helps to make the pressure profile more homogenous before being sensed by the sense tube, and may ensure a uniform or more uniform pressure is supplied to the actuator assembly.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed is:

1. A fluid regulating device, comprising:
   a valve body having an inlet, an outlet, and a valve port;
   a control element shiftably disposed within the valve body, the control element adapted to be displaced relative to the valve port to control the flow of a fluid between the inlet and the outlet;
   a control assembly comprising a valve actuator, the control assembly operatively coupled to the control element, the control assembly including a diaphragm disposed adjacent a diaphragm chamber;
   a sense tube having a first end, a second end, and an intermediate portion, the first end positioned to provide flow communication with the diaphragm chamber of the control assembly, the second end disposed adjacent a distal portion of the outlet and the intermediate portion disposed between the first end and the second end and adjacent an intermediate portion of the outlet;
   a shoulder positioned in the intermediate portion of the sense tube, the shoulder comprising a first end facing in an upstream direction and having an external diameter greater than an external diameter of the first end and greater than an external diameter of the second end; and
   a flared portion coupled to the sense tube adjacent the second end and positioned so that the fluid flows over an outwardly facing surface of an axial length of the flared portion during operation.

2. The device of claim 1, wherein the sense tube includes a bend, and wherein the shoulder is disposed in a downstream direction from the bend.

3. The device of claim 1, wherein the outlet end of the valve body includes an outlet face, and wherein the outlet of the sense tube is positioned past the outlet face in a downstream direction.

4. The device of claim 1, wherein the sense tube includes a length adjuster.

5. The device of claim 1, wherein the flared portion is adjustable.

6. The device of claim 1, wherein the flared portion includes a flexible section, the flexible section arranged to shift between a first flared position in which the flexible section is oriented at a first angle relative to an axis of the outlet, and a second flared position in which the flexible section is oriented at a second angle relative to the axis of the outlet, the second angle greater than the first angle.

7. The device of claim 1, wherein the shoulder comprises a cylinder extending along the sense tube.

8. The device of claim 7, wherein the cylinder includes a downstream end, and wherein the flared portion is spaced away from the downstream end of the cylinder.

9. The device of claim 1, wherein the sense tube includes a first portion extending from the first end through a bend, and includes a second portion carrying the shoulder and the flared portion, and wherein the second portion is removably attached to the first portion.

10. The device of claim 9, wherein the first and second portions are joined by a pin in slot connection.

11. The device of claim 9, wherein the first and second portions are joined by a threaded connection.

12. A fluid regulating device, comprising:
    a valve body having an inlet, an outlet, and a valve port, the valve body defining a flow path extending from adjacent the inlet, through the valve port, and exiting through the outlet along an outlet axis;
    a control element shiftably disposed within the valve body, the control element displaceable relative to the valve port to control the flow of a fluid between the inlet and the outlet;
    a control assembly comprising a valve actuator, the control assembly operatively coupled to the control element, the control assembly including a diaphragm disposed adjacent a diaphragm chamber;
    a sense tube having a first end, a second end, and an intermediate portion, the first end positioned to provide flow communication with the diaphragm chamber of the control assembly, the second end disposed adjacent a distal portion of the outlet and the intermediate portion disposed between the first end and the second end and adjacent an intermediate portion of the outlet;
    a flow interrupter disposed in the flow path and positioned in the intermediate portion of the sense tube, the flow interrupter comprising a first end facing in an upstream direction and having an external diameter greater than an external diameter of the first end and greater than an external diameter of the second end; and
    a flared portion coupled to the sense tube and disposed in the flow path adjacent the second end and downstream of the flow interrupter, the flared portion being positioned so that the fluid flows over an outwardly facing surface of an axial length of the flared portion during operation.

13. The device of claim 12, wherein the outlet end of the valve body includes a flange, and wherein the outlet of the sense tube is positioned past the flange in a downstream direction.

14. The device of claim 12, wherein the sense tube includes a length adjuster, the length adjuster arranged to adjust a position of the flared portion along the flow path.

15. The device of claim 12, wherein the sense tube includes a length adjuster, the length adjuster arranged to adjust a position of the flow interrupter along the flow path.

16. The device of claim 12, wherein the sense tube includes a first portion including the first end and a second portion including the flow interrupter, the flared portion and the second end, and wherein the second portion is removably attached to the first portion.

17. The device of claim 12, wherein the flared portion is adjustable.

18. The device of claim 12, wherein the flared portion includes a flexible section, the flexible section arranged to shift between a first flared position in which the flexible section is oriented at a first angle relative to the axis of the outlet, and a second flared position in which the flexible section is oriented at a second angle relative to the axis of the outlet, the second angle greater than the first angle.

19. The device of claim 12, wherein the flow interrupter includes a circular cross-section and surrounds the intermediate portion of the sense tube.

20. The device of claim 19, wherein the flow interrupter comprises a cylinder having an upstream end and a downstream end, and wherein the flared portion is spaced away from the downstream end of the cylinder.

21. A method of sensing output pressure in a fluid regulating device, the method comprising the steps of:
   providing a valve body having an inlet, an outlet, and a valve port, the valve body defining a flow path extending from adjacent the inlet, through the valve port, and exiting through the outlet along an outlet axis;
   providing a control element shiftably disposed within the valve body, the control element displaceable relative to the valve port to control the flow of a fluid between the inlet and the outlet;
   providing a control assembly comprising a valve actuator, the control assembly operatively coupled to the control element, the control assembly including a diaphragm disposed adjacent a diaphragm chamber;
   providing a sense tube having a first end, a second end, and an intermediate portion disposed between the first end and the second end;
   positioning the first end to provide flow communication with the diaphragm chamber of the control assembly;
   positioning the second end adjacent a distal portion of the outlet of the valve body;
   positioning a flow interrupter along the flow path adjacent the intermediate portion of the sense tube, the flow interrupter comprising a first end facing in an upstream direction and having an external diameter greater than an external diameter of the first end and greater than the external diameter of the second end; and
   providing a flared portion on the sense tube, and positioning the flared portion adjacent the second end of the sense tube and downstream of the flow interrupter so that the fluid flows over an outwardly facing surface of an axial length of the flared portion during operation.

22. The method of claim 21, including forming the flow interrupter from a cylinder having an upstream end and a downstream end, and spacing the flared portion away from the downstream end of the cylinder.

23. The method of claim 21, wherein the outlet end of the valve body includes a flange, and including positioning the second end of the sense tube past the flange in a downstream direction.

24. The method of claim 21, including providing the sense tube with a length adjuster, and adjusting the position of the flared portion along the flow path.

25. The method of claim 21, including providing the sense tube with a length adjuster, and adjusting the position of the flow interrupter along the flow path.

26. The method of claim 21, including providing the sense tube with a first portion including the first end, and providing the sense tube with a second portion including the flow interrupter, the flared portion and the second end, and providing a removable coupling for securing the second portion to the first portion.

27. The method of claim 21, including providing the flared portion with a flexible section, and arranging the flexible section to shift between a first flared position in which the flexible section is oriented at a first angle relative to the axis of the outlet, and a second flared position in which the flexible section is oriented at a second angle relative to the axis of the outlet, the second angle greater than the first angle.

* * * * *

UNITED STATES PATENT AND TRADEMARK OFFICE
CERTIFICATE OF CORRECTION

PATENT NO. : 8,739,819 B2
APPLICATION NO. : 13/006275
DATED : June 3, 2014
INVENTOR(S) : Gregory L. Foust et al.

Page 1 of 1

It is certified that error appears in the above-identified patent and that said Letters Patent is hereby corrected as shown below:

On the Title Page:

Item (74), line 1, "Marshall" should be -- Marshall, --.

In the Specification:

At Column 4, line 63, "shoulder 70" should be -- shoulder 76 --.

At Column 8, line 4, "FIG. 5 in 6," should be -- FIGS. 5 and 6, --.

At Column 8, line 12, "and or" should be -- and/or --.

Signed and Sealed this
Sixth Day of October, 2015

Michelle K. Lee
*Director of the United States Patent and Trademark Office*